US007260660B1

(12) United States Patent
Nekl (10) Patent No.: US 7,260,660 B1
(45) Date of Patent: Aug. 21, 2007

(54) FLOW CONTROL BY SUPPLYING A REMOTE START BIT ONTO A SINGLE-WIRE BUS

(75) Inventor: Joshua J. Nekl, Nampa, ID (US)

(73) Assignee: ZiLOG, Inc., San Jose, CA (US)

( * ) Notice: Subject to any disclaimer, the term of this patent is extended or adjusted under 35 U.S.C. 154(b) by 214 days.

(21) Appl. No.: 10/851,882

(22) Filed: May 21, 2004

(51) Int. Cl.
G06F 12/00 (2006.01)
G06F 13/12 (2006.01)

(52) U.S. Cl. ............... 710/106; 710/105; 710/305; 710/310; 710/71; 711/100; 711/170; 370/514; 370/538; 370/463

(58) Field of Classification Search ............... 710/105, 710/106, 71, 305, 310; 711/100, 170; 370/514, 370/538, 463
See application file for complete search history.

(56) References Cited

U.S. PATENT DOCUMENTS

| | | | |
|---|---|---|---|
| 4,556,958 A | 12/1985 | Ugon | 364/200 |
| 4,907,225 A * | 3/1990 | Gulick et al. | 370/463 |
| 5,361,376 A * | 11/1994 | Cummins et al. | 710/305 |
| 5,398,326 A | 3/1995 | Lee | 395/425 |
| 5,625,842 A * | 4/1997 | Dalrymple | 710/22 |
| 6,112,275 A * | 8/2000 | Curry et al. | 711/100 |
| 6,366,632 B1 * | 4/2002 | Noh | 375/371 |
| 6,378,011 B1 * | 4/2002 | Moore et al. | 710/71 |
| 6,381,661 B1 * | 4/2002 | Messerly et al. | 710/63 |
| 6,738,855 B1 * | 5/2004 | Goldman | 710/315 |
| 6,876,678 B1 * | 4/2005 | Chow et al. | 370/538 |
| 6,959,014 B2 * | 10/2005 | Pohlmeyer et al. | 370/514 |
| 2002/0071484 A1 * | 6/2002 | Spichale | 375/238 |
| 2002/0124149 A1 * | 9/2002 | Ni | 711/170 |

FOREIGN PATENT DOCUMENTS

WO   WO 03/096036   11/2003

OTHER PUBLICATIONS

Datasheet entitled "PC 16550D Universal Asynchronous Receiver/Transmitter with FIFOs," by National Semiconductor Corporation, Jun. 1995, 22 pages.
"On-Chip Debugger" portion of Preliminary Product Specification entitled "Z8 Encore 1 Microcontrollers with Flash Memory and 10-Bit A/D Converter," by ZiLOG, Inc., 2002, pp. 148-161.

* cited by examiner

Primary Examiner—Paul R. Myers
Assistant Examiner—Brian Misiura
(74) Attorney, Agent, or Firm—Imperium Patent Works; Darien K. Wallace; T. Lester Wallace (57) ABSTRACT

A single-wire communication bus couples a transmitting device to a UART in a receiving device. Flow control circuitry in the UART fills a transmit memory buffer with remote data. The UART supplies a remote start bit onto the single-wire bus for each byte of remote data written into the transmit memory buffer. After detecting a remote start bit on the single-wire bus, the transmitting device supplies initial data bits and a stop bit, which together form an RS232 character. Data flow is controlled when the UART supplies a subsequent remote start bit only after data has been read out of the UART freeing up bytes in a receive memory buffer. After the transmitting device detects the subsequent remote start bit, the transmitting device supplies subsequent data bits onto the single-wire bus. In another embodiment, flow control circuitry functionality is performed by flow control code in the receiving device operating system.

27 Claims, 7 Drawing Sheets

FIG. 1

DATA TRANSMISSION AND FLOW
CONTROL THROUGH A SINGLE PIN

FLOW CONTROL IN A RECEIVING DEVICE
FROM A SINGLE-WIRE COMMUNICATION BUS

FIG. 7

FLOW CONTROL BY SUPPLYING A REMOTE START BIT ONTO A SINGLE-WIRE BUS

TECHNICAL FIELD

The present invention relates generally to a single-pin communication interface and, more specifically, to a method of controlling the flow of data through the single-pin interface by communicating exclusively through the single-pin interface.

CROSS-REFERENCE TO COMPACT DISC APPENDIX

Compact Disc Appendix, which is a part of the present disclosure, is one recordable Compact Disc (CD-R) containing information that is part of the disclosure of the present patent document. The Compact Disc contains hardware description in Verilog of a remote start bit UART circuit of a microcontroller integrated circuit. The remote start bit UART circuit carries out a method in accordance with one specific embodiment of the present invention. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BACKGROUND

As semiconductor devices become smaller and are placed in ever smaller packages, the space occupied by the input/output pins of an integrated circuit contributes significantly to the overall area of the packaged semiconductor device. Thus, device size can be reduced by reducing the number of pins on each integrated circuit. One way to reduce the number of pins is to share a single pin for both the transmit and the receive operations. A single-pin interface can be used both to transmit and to receive data signals conforming to the well-known "RS232" asynchronous protocol.

Where data signals are received into a memory buffer of a receiving device, the receive buffer can overflow unless the flow of data is controlled. For example, a receive buffer can overflow when data is received too quickly from a single-pin interface. The receive buffer overflows if data is not read out of the receive buffer faster than data is received from the single-pin interface. For example, a receive overrun problem can occur where the receiving device is a personal computer (PC) that receives sixty-four Kbytes of data from a FLASH array into a 16-byte first-in-first-out (FIFO) memory buffer in a universal asynchronous receiver/transmitter (UART). The operating system running on the PC ideally reads some bytes of data out of the memory buffer before more bytes of data are loaded into the memory buffer. The memory buffer overflows, however, where an application or driver that is running on the operating system does not release control back to the central processing unit (CPU) of the PC quickly enough after the CPU receives an interrupt command to read the memory buffer.

A flow control mechanism is needed to solve the receive overrun problem by interrupting the transmission of bytes of data in the middle of a communication stream. Various hardware and software flow control mechanisms have been implemented with bidirectional, full-duplex communication protocols, such as RS232.

Hardware flow control uses additional signaling lines to throttle the data rates transmitted by the target device. Hardware flow control is not possible on a single-wire communication bus because hardware flow control requires additional control signals to be sent over additional wires. Hardware flow control is not appropriate for small pin-count devices because it requires the use of an additional pin.

Software flow control involves the receiving device sending XON and XOFF commands to the transmitting device causing pauses in the data transmission. Software flow control is not possible on a single-wire communication bus that supports only half-duplex communication. The XON and XOFF flow control commands can be sent only in full-duplex communication. The receiver cannot send an XOFF command to the transmitter if the receiver is receiving data on a half-duplex communication channel.

Some existing implementations of flow control on a single-wire communication bus have obviated the need for flow control by limiting the size of read requests. These implementations employ polling with a "read command." A host sends a "read command" to request data from a target. Flow control is inherently implemented in that the host controls how much data it requests. Flow control is not necessary, for example, where the host requests only one byte of data at a time. Reading only one byte of data at a time in response to a read command, however, is slow and inefficient. If the host requests a larger block of data from the target, flow control again becomes a problem because there is no way to pause the data transmission once it has started.

A method is sought for implementing flow control for a large block of data over a single-wire communication bus.

SUMMARY

A system controls the flow of data over a single-wire communication bus from a target device to a host device. The host device supplies a remote start bit onto the single-wire communication bus. Open-drain interfaces couple the single-wire communication bus to the host device and to a remote start bit universal asynchronous receiver/transmitter (UART) in the target device. The voltage on the single-wire communication bus is pulled up by a pull-up resistor and can only be pulled down at the open-drain interfaces. After the remote start bit UART detects the remote start bit, the remote start bit UART supplies initial data bits and a stop bit onto the single-wire communication bus. A 10-bit RS232 character is formed by the remote start bit, the data bits and the stop bit. The host device supplies a subsequent remote start bit only after accepting the initial data bits. After the remote start bit UART detects the subsequent remote start bit on the single-wire communication bus, the remote start bit UART supplies subsequent data bits onto the single-wire communication bus. In this manner, flow control is achieved over the single-wire communication bus.

The remote start bit UART includes a baud clock and determines a pulse duration of the remote start bit and supplies each of the data bits onto the single-wire communication bus for a time period of one pulse duration.

In another embodiment, the system is capable of driving the voltage high on the single-wire communication bus faster than would be possible with the pull-up resistor alone. The remote start bit UART is capable of driving the voltage on single-wire communication bus high at the transition between each logic low bit and a following logic high bit transmitted by the target device. By accelerating the voltage rise time on the single-wire communication bus, the remote start bit UART permits data transmission at accelerated speeds for which data flow control is more likely to be advantageous.

In yet another embodiment, flow control logic circuitry fills a transmit memory buffer in the receiving device with a number of bytes of data equal to the number of free bytes in a receive memory buffer. A remote start bit is supplied onto the single-wire communication bus for each byte of remote data bits written into the transmit memory buffer.

In yet another embodiment, the functionality of the flow control logic circuitry is performed by software flow control code. The flow control code is part of a communication application that runs on an operating system on the receiving device. In another embodiment, the flow control code is part of the operating system.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

This application is related to the U.S. patent application Ser. No. 10/851,460 entitled "Single-Pin Serial Communication Link With Start-Bit Flow Control," by Joshua J. Nekl, filed on May 21, 2004, which is herein incorporated by reference. Reference will now be made in detail to some embodiments of the invention, examples of which are illustrated in the accompanying drawings.

Figure 1:
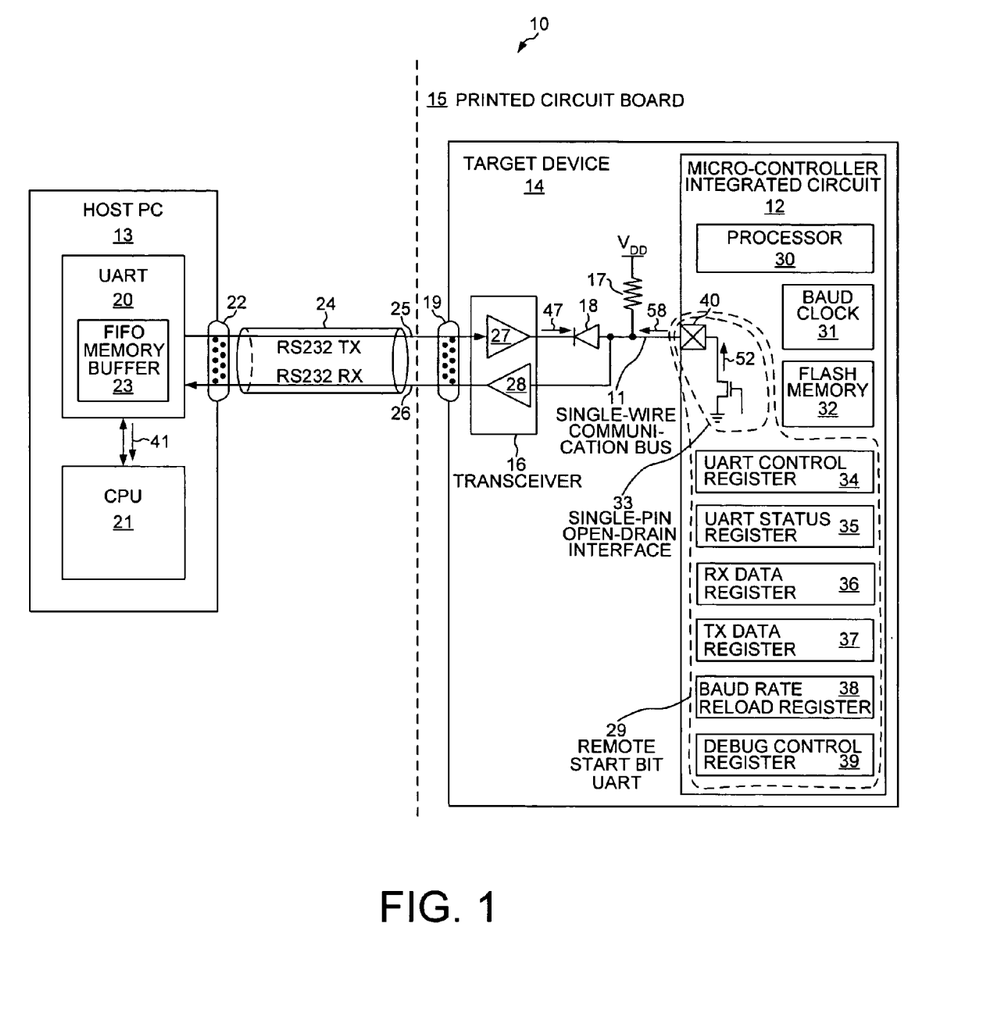
FIG. 1 is a simplified schematic block diagram of a system for controlling the flow of data over a single-wire communication bus from a target device to a host PC.

FIG. 1 shows a system 10 for controlling the flow of data over a single-wire communication bus 11 from a microcontroller integrated circuit 12 to a host device 13. In a first embodiment, host device 13 is an Intel-based, x86 personal computer (PC). Microcontroller 12 is part of a target device 14 that is mounted onto a printed circuit board 15 and that transmits data to host PC 13. Target device 14 includes single-wire communication bus 11, microcontroller 12, a transceiver 16, a pull-up resistor 17, a diode 18 and a standard nine-pin, RS232 serial port 19. Host PC 13 includes a standard universal asynchronous receiver/transmitter (UART) 20, a central processing unit (CPU) 21 and a standard nine-pin, RS232 serial port 22. UART 20 contains a first-in-first-out (FIFO) memory buffer 23. Target device 14 is connected to host PC 13 by a nine-wire RS232 cable 24. Of the nine wires, only an RS232 transmit wire 25, an RS232 receive wire 26 and a ground wire are used in the first embodiment. Transmit wire 25 is coupled to a transmit buffer 27 of transceiver 16. Receive wire 26 is coupled to a receive buffer 28 of transceiver 16.

Microcontroller 12 includes a remote start bit UART 29, a processor 30, a baud clock 31 and a FLASH memory array 32. Remote start bit UART 29 includes a single-pin interface 33, a UART control register 34, a UART status register 35, a receive data register 36, a transmit data register 37, a baud rate reload register 38 and a debug control register 39. Single-pin interface 33 includes an input/output pin 40. Single-pin interface 33 is a bi-directional, half-duplex, open-drain interface over which data is both transmitted from and received into microcontroller 12.

Single-wire communication bus 11 is coupled to single-pin interface 33, transmit wire 25, receive wire 26 and pull-up resistor 17. Pull-up resistor 17 tends to pull the voltage present on single-wire communication bus 11 to $V_{DD}$. In the first embodiment, single-pin, open-drain interface 33 can only pull down the voltage on single-wire communication bus 11. Single-wire communication bus 11 is coupled to transmit wire 25 through transmit buffer 27 and diode 18. The cathode of diode 18 is coupled through transmit buffer 27 to transmit wire 25, and the anode of diode 18 is coupled to single-wire communication bus 11. Thus, diode 18 renders transmit wire 25 open drain, and a signal on transmit wire 25 can only pull down the voltage on single-wire communication bus 11. UART 20 of host PC 13 does not transmit on receive wire 26, so receive wire 26 does not pull down the voltage on single-wire communication bus 11. In the first embodiment, single-wire communication bus 11 is therefore in a "wire AND" configuration because a digital high must be present on both single-pin interface 33 and transmit wire 25 for single-wire communication bus 11 to exhibit a digital high. As a consequence, transmit and receive operations cannot occur simultaneously over single-pin, open-drain interface 33 of remote start bit UART 29.

In one example of the operation of system 10, the flow of data is controlled when host PC 13 requests to read sixty-four Kbytes of data out of FLASH memory 32 of target device 14. Target device 14 transmits data to host PC 13 in conformity with the asynchronous protocol defined by RS232. Each RS232 character of data is transmitted as one start bit, an 8-bit data payload packet (least-significant bit first) and one stop bit. Sixteen bytes of the sixty-four Kbytes of data can be stored in memory buffer 23 of host PC 13 at any given time.

Some bytes of the sixty-four Kbytes of data should not be loaded in FIFO memory buffer 23 until after the operating system running on host PC 13 has read at least the same number of bytes of data out of FIFO memory buffer 23. After some predetermined number of bytes of data is loaded into memory buffer 23, CPU 21 receives an interrupt command 41 to read memory buffer 23. Where an application is running on the operating system and does not release control back to CPU 21 quickly enough after CPU 21 receives interrupt command 41, subsequent bytes of data can be loaded in memory buffer 23 before previous bytes of data have been read, and the previous bytes of data are overwritten and lost to host PC 13. To prevent memory buffer 23 from overflowing, system 10 controls the flow of data from target device 14 until host PC 13 is ready to accept subsequent data.

Data transmitted by any device coupled to a wire AND bus is seen by all the devices. Thus, if either host PC 13 or target device 14 pulls single-wire communication bus 11 low, the signal is seen by the other device. Flow control is implemented on single-wire communication bus 11 by having the receiving device issue the RS232 start bit, instead of allowing the transmitter to send the start bit. In this example of controlling the flow of data from microcontroller 12 in target device 14 to host PC 13, microcontroller 12 is the transmitting device, and host PC 13 is the receiving device.

One advantage of the flow control method implemented by system 10 is that minimal hardware is needed to provide the wire AND configuration of single-wire communication bus 11 in target device 14. Another advantage of the flow control method is that it can easily be implemented using a standard serial port on host PC 13. To produce a remote start bit, host PC 13 transmits a hex character [FF], causing UART 20 of host PC 13 to supply the start bit onto single-wire communication bus 11 and then to release the bus high for the remaining data bits and stop bit that are all set to logic high. Target device 14 sees the start bit on single-wire communication bus 11 and then transmits its data concurrently with the hex character [FF] from host PC 13. Logic-low bits in the transmitted data pull the voltage on single-wire communication bus 11 low.

Figure 2:
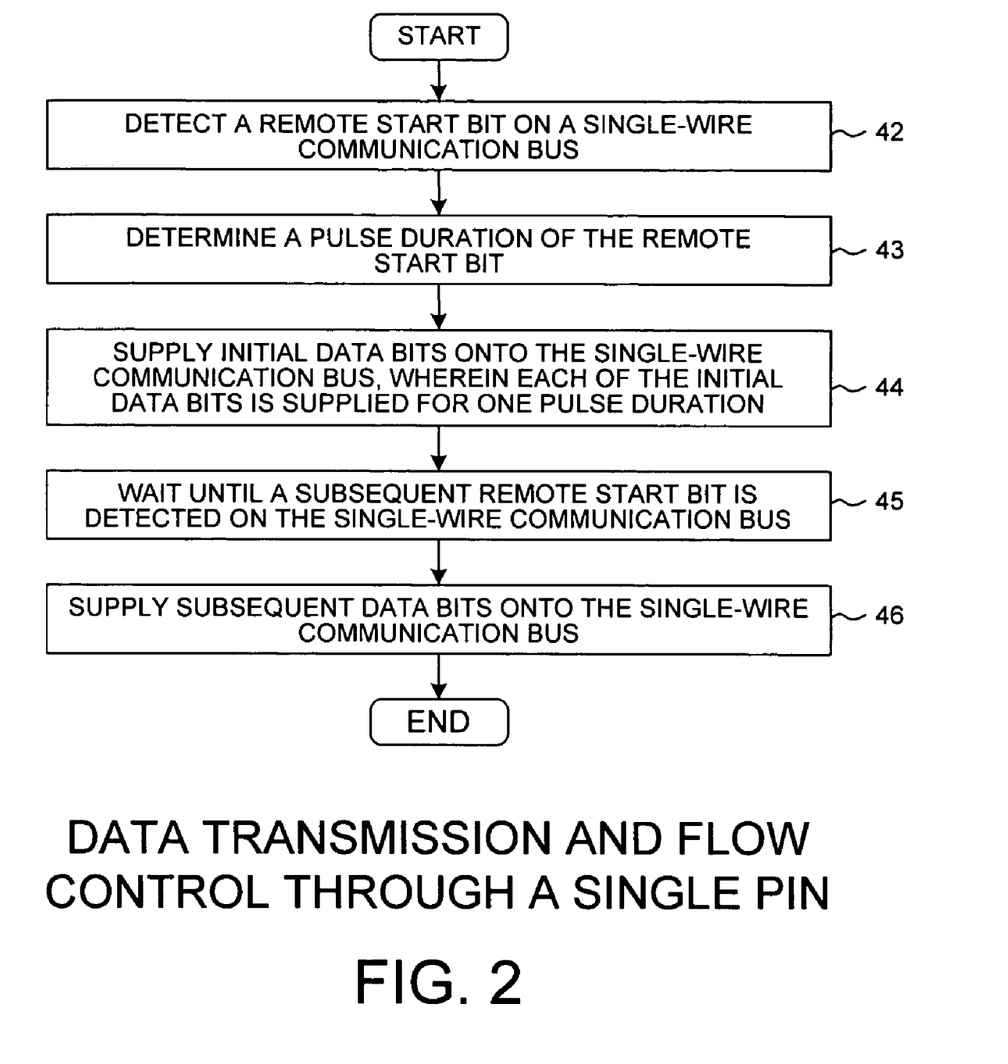
FIG. 2 is a flowchart of steps for controlling the flow of data over a single-wire communication bus.

FIG. 2 is a flowchart illustrating steps 42-46 of a method by which system 10 controls the flow of data over single-wire communication bus 11 from microcontroller 12 to host PC 13. Flow control is implemented after host PC 13 requests to read sixty-four Kbytes of data out of FLASH memory 32 of target device 14. The steps of FIG. 2 will now be described in relation to flow control system 10 shown in FIG. 1.

Initially in a step 42, the transmitting device waits to transmit data until it detects a start bit transmitted by the receiving device. After host PC 13 requests to read data from target device 14, microcontroller 12 waits to transmit an 8-bit RS232 data payload packet until microcontroller 12 detects a remote start bit 47 (as shown in FIG. 1) on single-wire communication bus 11 issued by UART 20 of host PC 13. UART 20, for example, is a hardware UART from National Semiconductor Corporation with part number 16550D. UART 20 issues remote start bit 47 by transmitting the hex character [FF] (11111111) in RS232 protocol with one logic-low start bit and one logic-high stop bit. Because pull-up resistor 17 pulls the voltage high on single-wire communication bus 11, the eight logic-high data bits and the logic-high stop bit of the hex character [FF] are not distinguishable from the voltage on single-wire communication bus 11 when no signals are transmitted or received. The hex character [FF] appears as a single bit of logic low.

Figure 3:
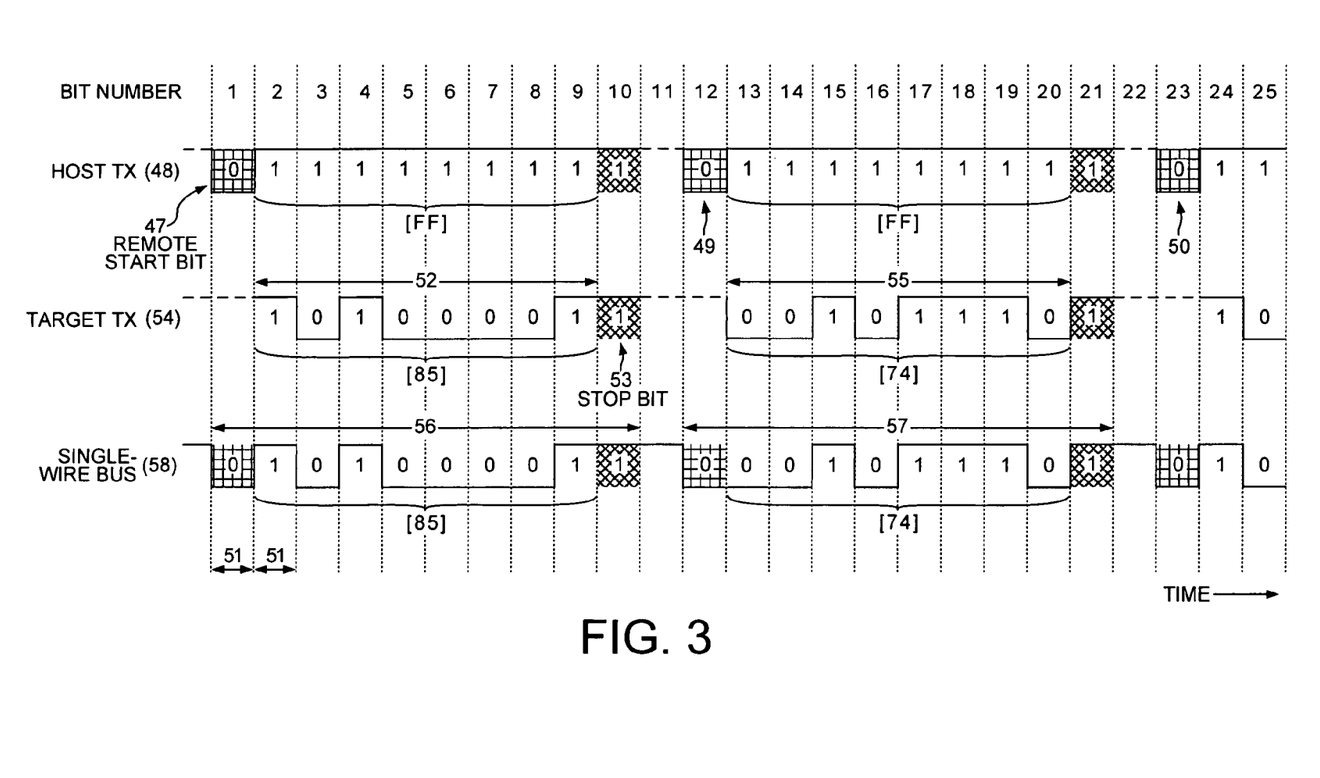
FIG. 3 is a waveform diagram illustrating the operation of the single-wire communication bus of FIG. 1.

FIG. 3 shows waveform diagrams of signals on single-wire communication bus 11 over a time period of twenty-five bit pulse durations. Remote start bit 47 is shown as part of a host transmit signal 48 transmitted by UART 20 of host PC 13. Remote start bit 47 is the first bit of a 10-bit hex character [FF]. Two subsequent remote start bits 49 and 50 appear at bits twelve and twenty-three of host transmit signal 48.

In a step 43, microcontroller 12 determines a pulse duration 51 of the remote start bit. Microcontroller 12 uses baud clock 31 to determine the baud rate at which UART 20 of host PC 13 transmits. In one example, remote start bit UART 29 directly measures pulse duration 51 by detecting the falling edge of the remote start bit and then the rising edge of the remote start bit. In another example, remote start bit UART 29 indirectly determines the pulse duration of the remote start bit by measuring the total time duration of the eight data bits in a hex character for which the least significant bit is one and the most significant bit is zero. For example, remote start bit UART 29 is programmed to determine the baud rate at which UART 20 of host PC 13 transmits when remote start bit UART 29 receives the predetermined hex character [0D] having an 8-bit RS232 data payload of (10110000) (least-significant bit first). UART 20 of host PC 13 transmits the hex character [0D] (the ASCII Carriage Return character) for auto-baud detection before transmitting the hex character [FF] with remote start bit 47. Remote start bit UART 29 then measures the time duration from the end of the logic low start bit to the beginning of the logic high stop bit. Remote start bit UART 29 then calculates pulse duration 51 based on the measured total time duration of the eight data bits.

In a step 44, after microcontroller 12 has detected remote start bit 47 in step 42, microcontroller 12 supplies initial data bits 52 (as shown in FIG. 1) onto single-wire communication bus 11. Each of the initial data bits 52 is supplied for a time period of one pulse duration 51. The initial data bits 52 are transmitted in an RS232 character with eight data bits and one stop bit 53, but without the start bit specified in the RS232 protocol. FIG. 3 shows a target transmit signal 54 in which the initial data bits 52 and subsequent data bits 55 are supplied onto single-wire communication bus 11. In this example, the initial data bits 52 form the hex character [85] (10100001), wherein the least significant bit is transmitted first. The subsequent data bits 55 form the hex character [74] (00101110) (least-significant bit first).

Although host PC 13 has supplied remote start bit 47 onto single-wire communication bus 11, and target device 14 has supplied the initial data bits 52 and stop bit 53, only one RS232 character is seen on single-wire communication bus 11. Two complete RS232 characters 56 and 57 are transmitted in a single-wire bus signal 58, even though different devices transmitted different parts of each character.

In a step 45, microcontroller 12 waits to transmit subsequent data bits 55 until microcontroller 12 detects subsequent remote start bit 49 on single-wire communication bus 11. After subsequent remote start bit 49 is detected, microcontroller 12 supplies subsequent data bits 55 onto single-wire communication bus 11 in a step 46. Although subsequent remote start bit 49 appears in FIG. 3 at bit twelve of host transmit signal 48 after a pause in transmission at bit 11, RS232 characters can also be transmitted back-to-back without any inter-character pause.

In further steps, microcontroller 12 transmits an additional byte of data after detecting each further remote start bit. In this manner, all sixty-four Kbytes of data are transmitted in a controlled manner from FLASH memory 32 of target device 14 to host PC 13 after a single read request command from host PC 13. Target device 14 can detect and act upon a remote start bit faster than target device 14 can execute a read request command. Therefore, the method of FIG. 2 provides a controlled transfer of data from target device 14 to host PC 13 that is faster than flow control techniques that transmit small data amounts, for example, single bytes, in response to read request commands as opposed to remote start bits.

Figure 4:
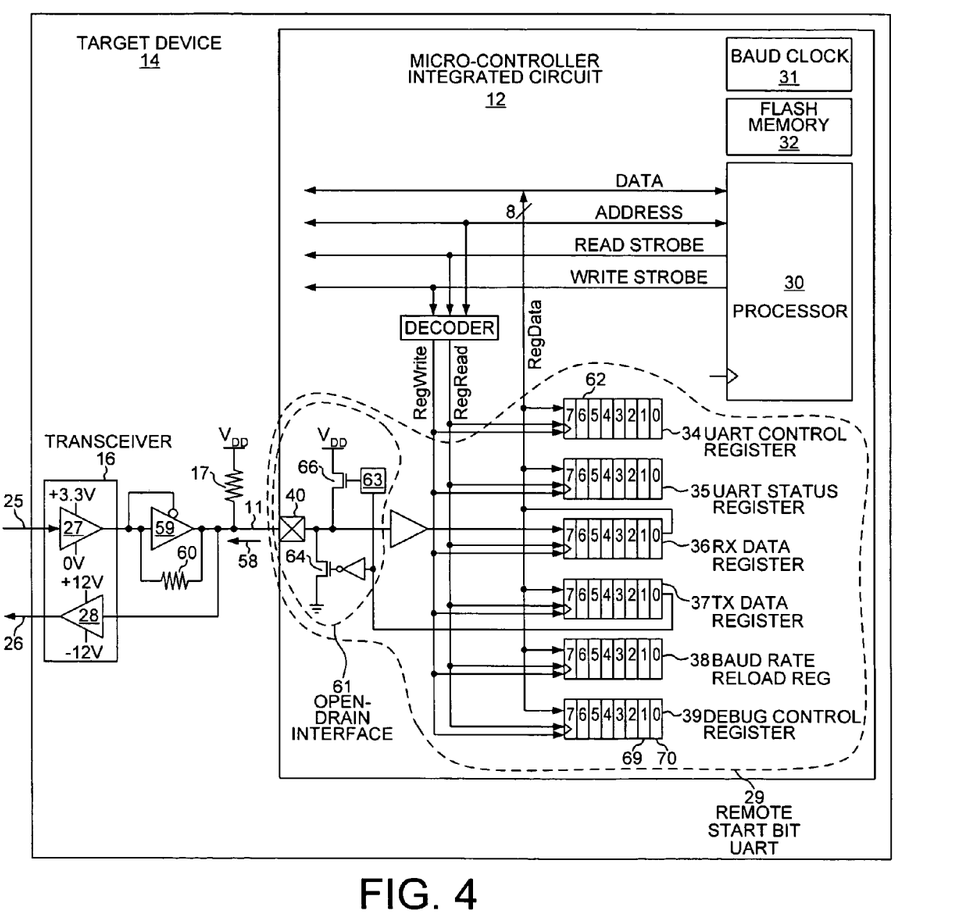
FIG. 4 is a more detailed block diagram of an embodiment of the target device of FIG. 1.

FIG. 4 is a more detailed diagram of a second embodiment of target device 14. In the first embodiment, diode 18 renders transmit wire 25 open drain. In the second embodiment, diode 18 is replaced by an open drain buffer 59 and a resistor 60. Open drain buffer 59 and resistor 60 are coupled to single-wire communication bus 11 such that a signal on transmit wire 25 can only pull down the voltage on single-wire communication bus 11, thereby rendering transmit wire 25 open drain. Open drain buffer 59 is coupled to transmit wire 25 through transmit buffer 27, which translates the ±12 volt signal level on RS232 transmit wire 25 to a signal level of +3.3V/0V of single-wire communication bus 11. In other embodiments, the logic level outputs onto single-wire communication bus 11 are +5V/0V.

In the first embodiment, the maximum baud rate at which bits can be transmitted over single-wire communication bus 11 is limited by the voltage rise time due to the impedance of single-wire communication bus 11. The second embodiment is capable of driving the voltage high on single-wire communication bus 11 faster than would be possible with pull-up resistor 17 alone. Remote start bit UART 29 of the second embodiment includes an open-drain interface 61 that is capable of driving the voltage on single-wire communication bus 11 high at the transition between each logic low bit and a following logic high bit that are output by transmit register 37. Thus, open-drain interface 61 is not open-drain at all times. This transmit drive high capability is enabled by setting bit six of UART control register 34, the transmit drive high bit 62, to one. Enabling the transmit drive high capability causes a drive high circuit 63 to couple input/output pin 40 to power $V_{DD}$ for one half of a clock period during each logic high bit that follows a logic low bit. A pulse duration lasts for one or more clock periods of microcontroller 12. Thus, voltage is driven high on single-wire communication bus 11 at most for one half of a pulse duration. Where the baud rate is slow, voltage can be driven high for significantly less than one half of a pulse duration.

Figure 5:
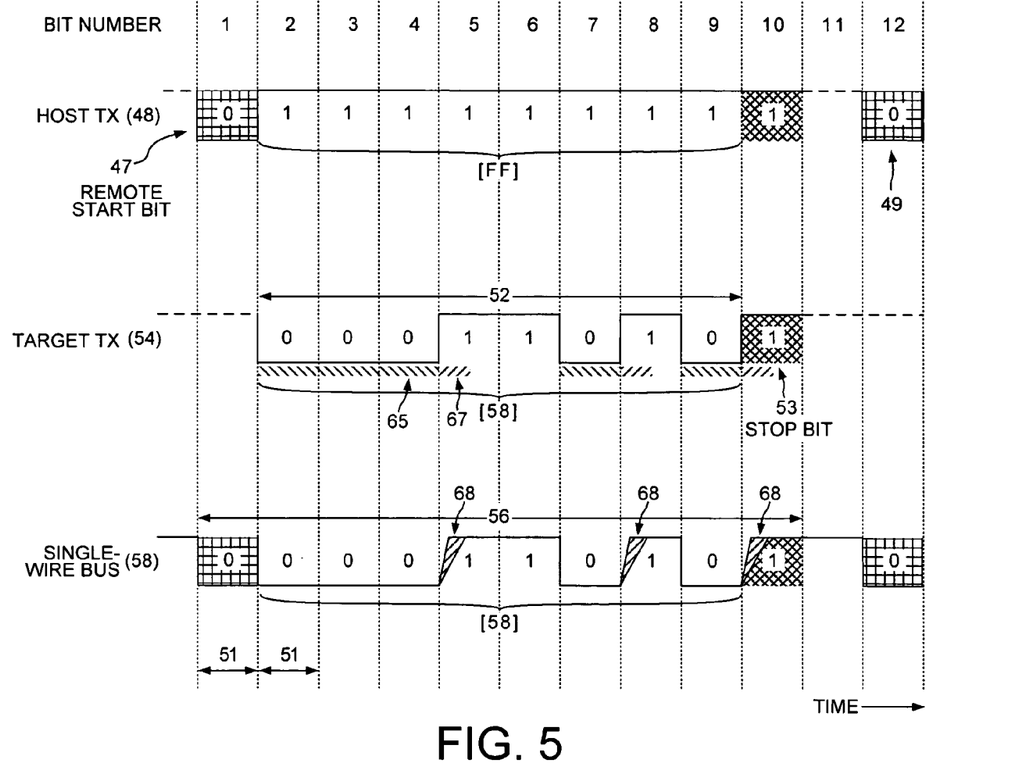
FIG. 5 is a waveform diagram illustrating the transmit drive high capability of the system of FIG. 1.

FIG. 5 is a waveform diagram illustrating an example of the capability of the second embodiment to drive the voltage high on single-wire communication bus 11. After detecting remote start bit 47, target device 14 transmits target transmit signal 54 containing initial data bits 52 that form the hex character [58] (00011010), wherein the least significant bit is transmitted first. Remote start bit UART 29 supplies the hex character [58] onto single-wire communication bus 11 by turning on a pull-down transistor 64 during the pulse durations of each logic low bit output by transmit register 37. The period over which pull-down transistor 64 is on is depicted in FIG. 5 by an area 65 of falling hash marks. Remote start bit UART 29 turns on a pull-up transistor 66 during the first half of each pulse duration of each logic high bit that follows a logic low bit. The period over which pull-up transistor 66 is on is depicted in FIG. 5 by an area 67 of rising hash marks. While pull-up transistor 66 is on, the voltage rise time on single-wire communication bus 11 is shorter. The accelerated voltage rise time is depicted by areas 68. By accelerating the voltage rise time on single-wire communication bus 11, remote start bit UART 29 permits data transmission at accelerated speeds for which data flow control is more likely to be advantageous.

Remote start bit UART 29 is capable of operating in a debug mode as well as in a bi-directional transmission mode. As shown in FIG. 4, debug control register 39 contains a UARTEN control bit 69 at bit one. UARTEN control bit 69 is set to one (the default setting) when remote start bit UART 29 is used as a single-pin, half-duplex, serial interface in the bi-directional transmission mode. When UARTEN control bit 69 is set to zero, remote start bit UART 29 can operate as an on-chip debugger that is capable of programming and erasing FLASH memory 32. Debug control register 39 also contains a DBGEN control bit 70 at bit zero. Remote start bit UART 29 operates in debug mode when UARTEN control bit 69 is set to zero, DBGEN control bit 70 is set to one, and the first character received after the baud rate is configured is the hex character [EB].

Figure 6:
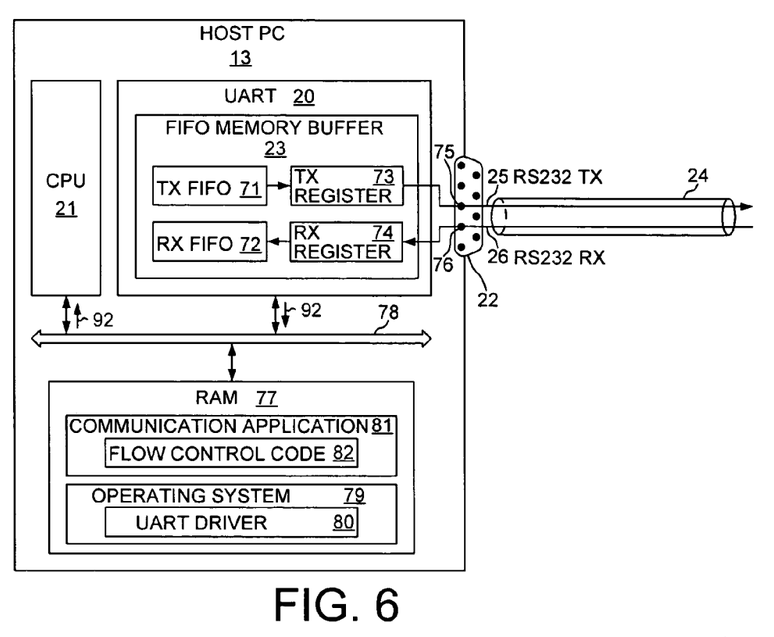
FIG. 6 is a simplified schematic block diagram of components within the host PC of FIG. 1 used for flow control in accordance with one embodiment.

FIG. 6 is a more detailed block diagram of host PC 13 of flow control system 10 of FIG. 1. Memory buffer 23 of UART 20 includes a 16-byte transmit FIFO memory 71, a 16-byte receive FIFO memory 72, a transmit shift register 73 and a receive shift register 74. Transmit shift register 73 is coupled to RS232 transmit wire 25 through a transmit pin 75 on RS232 serial port 22. Receive shift register 74 is coupled to RS232 receive wire 26 through a receive pin 76 on RS232 serial port 22. Host PC 13 includes a random access memory (RAM) 77 that is coupled to a data bus 78. CPU 21 is running operating system software 79 such as software sold under the names Windows®, Solaris®, Linux®, Mac OS® and UNIX®. Operating system 79 is stored in RAM 77. A UART driver 80 is part of operating system 79. A communication application 81 runs on operating system 79. Flow control code 82 is a subroutine within communication application 81.

In one example, communication application 81 ships with operating system 79. Communication application 81 either installs by default on operating system 79 or is installed at the time single-wire communication bus 11 is first used.

Figure 7:
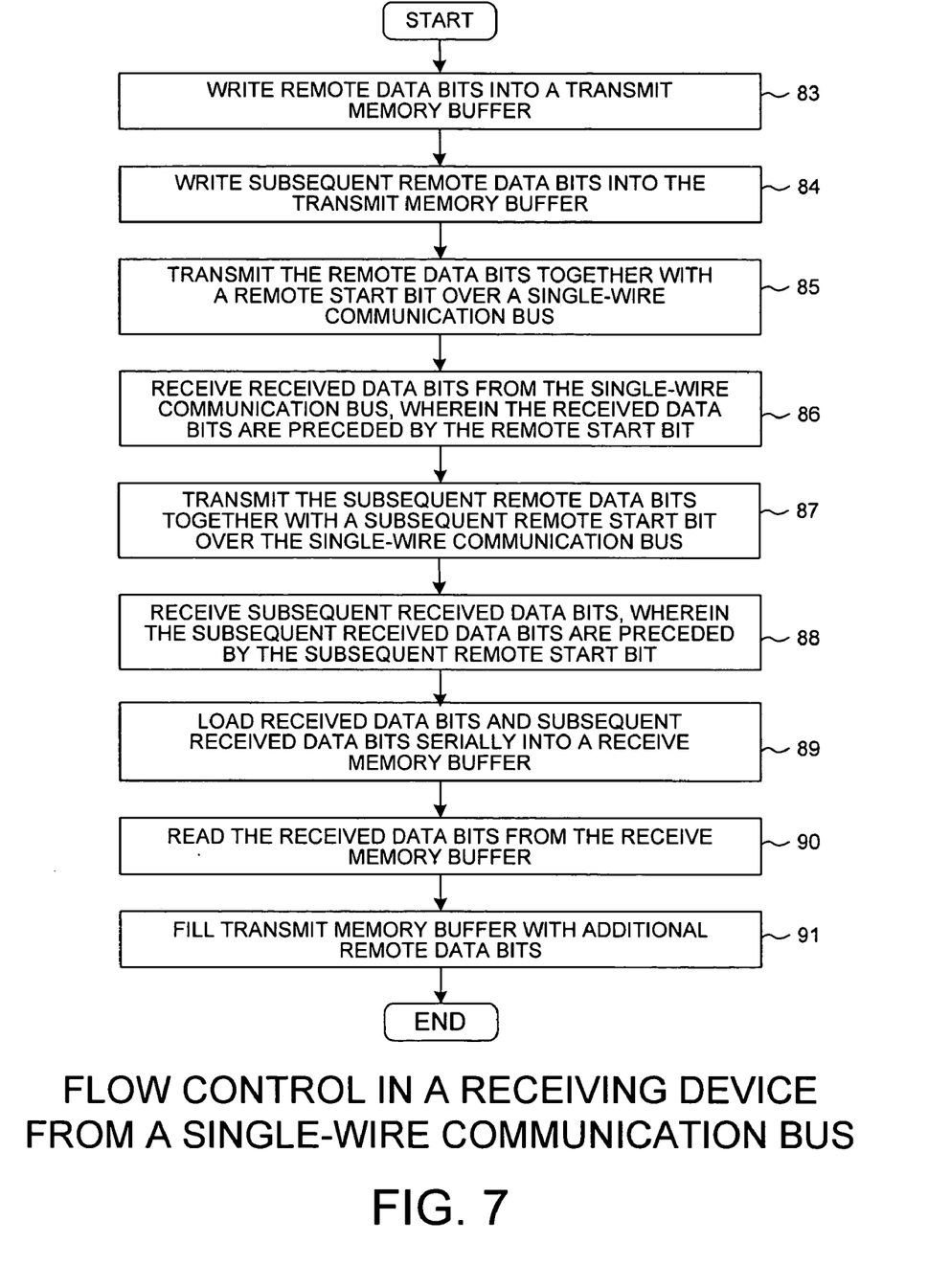
FIG. 7 is a flowchart of steps taken by a receiving device for controlling the flow of data over a single-wire communication bus.

FIG. 7 is a flowchart illustrating steps 83-91 of a method by which host PC 13 supplies remote start bits onto single-wire communication bus 11. Software flow control code 82 implements the method of FIG. 7 and supports flow control over single-wire communication bus 11. Flow control code 82 within communication application 81 implements the method of FIG. 7 in conjunction with operating system 79, UART driver 80, UART 20 and CPU 21, and the operation of flow control code 82 is part of the overall operation of system 10. Some of the steps 83-91 are performed concurrently by various components of system 10. The method of FIG. 7 will now be described in relation to the components of system 10 shown in FIG. 6.

In this example, flow control is implemented after communication application 81 receives a request to read data. Communication application 81 issues a system call to operating system 79 to open up RS232 serial port 22 of UART 20. Operating system 79 opens serial port 22 and then passes a file handle back to communication application 81. Communication application 81 uses the file handle to issue read and write system calls to operating system 79 to read from and write to serial port 22. Communication application 81 receives a request to read sixty-four Kbytes of data from target device 14. Communication application 81 calls the subroutine for flow control code 82. Flow control code 82 recognizes that 16-byte receive FIFO memory 72 will receive at least sixteen bytes of data. Flow control code 82 passes the file handle to operating system 79, making a request to transmit sixteen bytes of data. Each of the sixteen bytes is the hex character [FF]. The operating system 79 then instructs UART driver 80 to transmit the sixteen bytes of data located in a memory location identified by the file handle.

UART driver 80 writes the sixteen bytes of data to UART 20. Hardware of UART 20 places the sixteen bytes into transmit FIFO memory 71. The first of the sixteen bytes is eight remote data bits representing one hex character [FF]. The subsequent bytes of data are comprised of subsequent remote data bits.

In a step 83 of FIG. 7, the first byte of remote data bits is written into transmit FIFO memory 71. In a step 84, subsequent remote data bits are written into transmit FIFO memory 71. Hardware of UART 20 then transfers data from transmit FIFO memory 71 into transmit shift register 73, one byte at a time. As each of the sixteen bytes of data bits is transferred into transmit shift register 73, data bits are shifted out of transmit shift register 73 one-by-one serially through transmit pin 75. Each of the sixteen [FF] hex characters is transmitted with an RS232 start bit.

In a step 85, the remote data bits of the first byte of data are shifted out of transmit shift register 73 and transmitted with a remote start bit, which is detected by remote start bit UART 29 in target device 14. Remote start bit UART 29 supplies eight data bits and a stop bit onto single-wire communication bus 11 following the remote start bit supplied with the first [FF] hex character.

In a step 86, the data bits supplied by remote start bit UART 29 are received by UART 20 following the remote start bit. RS232 receive wire 26 is coupled to single-wire communication bus 11 and, therefore, simultaneously sees each remote start bit, the following data bits and a stop bit as a 10-bit RS232 character. Thus, one byte of data bits is received onto receive pin 76 as each [FF] hex character is shifted onto transmit pin 75.

In a step 87, subsequent remote data bits of the second byte of data are transferred from transmit FIFO memory 71 into transmit shift register 73 and are transmitted with a subsequent remote start bit, which is also detected by remote start bit UART 29. Remote start bit UART 29 supplies subsequent data bits and a stop bit following the subsequent remote start bit that is supplied along with a subsequent [FF] character.

In a step 88, the subsequent data bits supplied by remote start bit UART 29 are received by UART 20 following the subsequent remote start bit. In this manner, remote start bit UART 29 supplies each subsequent eight data bits onto single-wire communication bus 11 only upon detecting a subsequent remote start bit.

In a similar manner, remote data bits of each subsequent byte of the sixteen bytes of data are transferred from transmit FIFO memory 71 into transmit shift register 73 and are transmitted with a subsequent remote start bit.

Data bits received onto receive pin 76 are shifted serially into receive shift register 74. In a step 89, received data bits are then transferred into receive FIFO memory 72. Successive bytes of the sixty-four Kbytes of data from target device 14 are stored in receive FIFO memory 72 until the number of bytes stored reaches a "watermark." In this example, the watermark for 16-byte receive FIFO memory 72 is set to twelve bytes. In other cases, the watermark for a UART part number 16550D can be configured as 1, 4, 8 or 14 bytes. When the watermark is reached at twelve bytes, UART 20 sends an interrupt command 92 to CPU 21 instructing CPU 21 to read the contents of receive FIFO memory 72. Even after the watermark is reached, however, bytes of data bits continue to be received into receive FIFO memory 72 in response to remote start bits transmitted with [FF] characters thirteen through sixteen.

After operating system 79 reads data out of receive FIFO memory 72 into a buffer that resides within the operating system, flow control code 82 issues a system call to operating system 79 to read the bytes that operating system 79 read into its buffer in response to interrupt command 92. Flow control code 82 waits in the read call until operating system 79 returns the data.

In this example, a CPU-intensive graphics application is running on operating system 79 and delays the response time for CPU 21 to read the contents of receive FIFO memory 72. Therefore, receive FIFO memory 72 receives all sixteen bytes of data bits before CPU 21 reads the contents of receive FIFO memory 72.

At this point, system 10 controls the flow of data from target device 14 until host PC 13 is ready to accept subsequent data. Receive FIFO memory 72 is prevented from overflowing because flow control code 82 does not issue a subsequent call to operating system 79 to write more [FF] characters to RS232 serial port 22. Transmit FIFO memory 71 is empty. Consequently, subsequent remote start bits are not supplied onto single-wire communication bus 11, and remote start bit UART 29 does not supply subsequent data bits onto single-wire communication bus 11.

Eventually, in a step 90, operating system 79 reads the twelve bytes out of receive FIFO memory 72 and into other memory on host PC 13, such as RAM 77. In response to the read call from flow control code 82, operating system 79 sends the twelve bytes that it reads out of receive FIFO memory 72 to flow control code 82. When flow control code 82 receives the twelve bytes of data bits, flow control code 82 determines that (i) twelve bytes were transmitted from transmit FIFO memory 71 and (ii) twelve bytes are free in receive FIFO memory 72.

In a step 91, flow control code 82 causes transmit FIFO memory 71 to be filled with an additional twelve bytes, which is the number of free bytes in receive FIFO memory 72. Flow control code 82 issues a call to operating system 79 to write the twelve bytes to RS232 serial port 22, operating system 79 writes twelve [FF] characters to UART 20, and the hardware of UART 20 places the twelve [FF] characters into transmit FIFO memory 71.

Later, when operating system 79 reads the last four bytes received into receive FIFO memory 72 in response to the initial sixteen [FF] characters, flow control code 82 fills transmit FIFO memory 71 with an additional four bytes of [FF] characters in a similar fashion.

In another example of flow control, the flow of data to UART 20 occurs more efficiently by setting the watermark for 16-byte receive FIFO memory 72 at eight bytes. This allows CPU 21 more time to read from receive FIFO memory 72 before receive FIFO memory 72 becomes full.

After operating system 79 reads the eight bytes out of receive FIFO memory 72, operating system 79 sends the eight bytes to flow control code 82 in response to a read call from flow control code 82. When flow control code 82 receives the eight bytes of data bits, flow control code 82 determines that eight bytes were transmitted from transmit FIFO memory 71 and that eight bytes are free in receive FIFO memory 72. Flow control code 82 fills memory 71 back up with an additional eight bytes before memory 71 becomes empty. Flow control code 82 fills memory 71 by issuing a call to operating system 79 to write eight bytes to RS232 serial port 22. Then operating system 79 writes eight [FF] characters to UART 20. UART 20 places the eight [FF] characters into free memory locations of transmit FIFO memory 71 before all of the previously loaded [FF] character have been read out of transmit FIFO memory 71 into transmit shift register 73. By setting the water mark lower in this example, remote start bits are continuously supplied onto single-wire communication bus 11, and data transmission occurs faster than in the example where all [FF] characters are read out of transmit FIFO memory 71 before CPU 21 reads the contents of receive FIFO memory 72.

Setting the watermark at an even lower level, however, does not necessarily result in an even more efficient operation of system 10. Although the flow of data over single-wire communication bus 11 to host PC 13 might be faster, host PC 13 runs less efficiently because it is being interrupted more often to read smaller amounts of data out of receive FIFO memory 72.

Whereas flow control code 82 is described above example as being an application running on operating system 79, flow control code 82 can also be a part of operating system 79. In an embodiment of system 10 in which flow control code 82 plugs into and becomes part of operating system 79, flow control code 82 is typically delivered along with other components of operating system 79 that are sold under the names Windows®, Solaris®, Linux®, Mac OS® and UNIX®. In this embodiment, operating system 79 has many components, including a UART driver 80 and flow control code 82. File handles need not be passed between UART driver 80 and flow control code 82 in the embodiment in which flow control code 82 is part of operating system 79.

Figure 8:
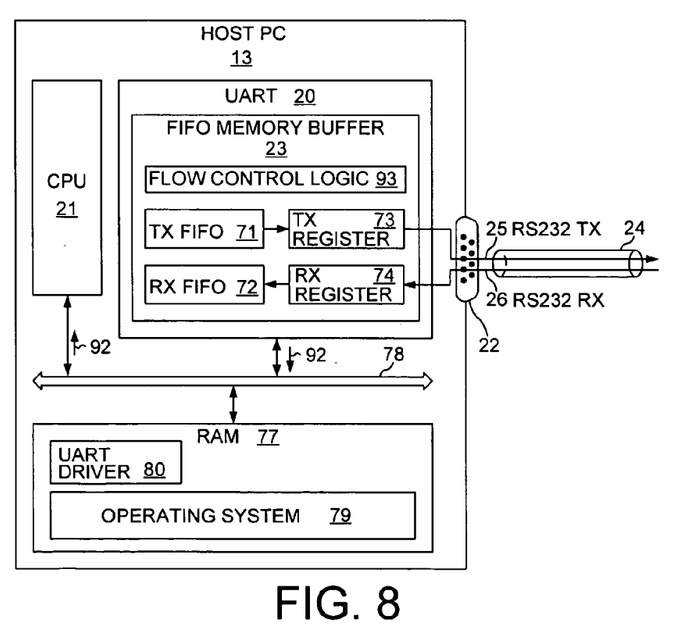
FIG. 8 is a simplified schematic block diagram of components within the host PC of FIG. 1 used for flow control in accordance with another embodiment.

FIG. 8 is a simplified block diagram of host PC 13 in yet another embodiment of system 10 in which the functionality of software flow control code 82 is performed by hardware within FIFO memory buffer 23. UART driver 80 is shown in FIG. 8 as a separate component installed onto operating system 79. In this embodiment, FIFO memory buffer 23 includes flow control logic circuitry 93; operating system 79 does not include flow control code 82. Flow control logic 93 is activated when operating system 79 receives a request to read data from single-wire communication bus 11. Flow control logic 93 determines how many bytes of data receive FIFO memory 72 is to receive.

Flow control logic 93 senses when operating system 79 reads out of receive FIFO memory 72 in response to interrupt command 92. When flow control logic 93 determines that additional memory locations in receive FIFO memory 72 have become free, flow control logic 93 fills transmit FIFO memory 71 with a number of bytes of data equal to or less than the number of free bytes in receive FIFO memory 72. Flow control logic 93 places the appropriate number of [FF] characters into transmit FIFO memory 71. Flow control logic 93 does not place more [FF] characters into transmit FIFO memory 71 than the total number of bytes of data receive FIFO memory 72 is to receive, for example, the sixty-four Kbytes of data from target device 14.

The aforementioned embodiments of system 10 control the flow of data only in the direction from target device 14 to host PC 13. Flow control in the reverse direction over single-wire communication bus 11 cannot be accomplished using only a standard UART on host PC 13, which is an advantage of the first embodiment. Additional hardware on host PC 13 would be required for bi-directional flow control, such as a specialized UART that can wait for and detect a remote start bit from target device 14 before beginning data transmission. Such a specialized UART would be substantially similar to remote start bit UART 29.

In yet another embodiment of system 10, the receiving device controls the flow of data by pulling the stop bit of a received RS232 character low, as opposed to supplying a remote start bit that is detected by the transmitting device. In this embodiment, target device 14 does not wait for a remote start bit from host PC 13 before transmitting each data byte. Instead, target device 14 transmits a standard RS232 character, complete with a start bit. If a host PC 13 is not able to process the data bits within the RS232 character, host PC 13 holds the voltage low on single-wire communication bus 11 after receiving the data bits, thus preventing target device 14 from supplying a logic-high stop bit onto single-wire communication bus 11. In the absence of a stop bit following the data byte, there is a framing error in the RS232 protocol. Remote start bit UART 29 recognizes the framing error, which indicates that host PC 13 is not ready to receive data. Target device 14 then waits to detect a remote start bit as described in the first embodiment before resuming data transmission. This embodiment requires a specialized UART on host PC 13.

In accordance with yet another embodiment, host PC 13 communicates other information to target device 14 by pulling the voltage on single-wire communication bus 11 low during the time that target device 14 is attempting to transmit a stop bit. The communicated information does not directly indicate a data overflow condition. Target device 14 attempts to transmit a digital logic-high stop bit, but it detects a digital logic-low on single-wire communication bus 11 during the stop bit time. In accordance with this embodiment, detection of the missing stop bit is used to change a mode of operation of system 10. In one example, the communicated information is an indication that UART 20 is no longer going to operate in a start bit flow control sub-mode of the bi-directional transmission mode. Target device 14 then switches into a non-flow control sub-mode in which target device 14 does not send a byte of data back to host PC 13 upon detecting a remote start bit on single-wire communication bus 11. In the same way that host PC 13 toggles operation of single-wire communication bus 11 from the start bit flow control sub-mode to the non-flow control sub-mode, host PC 13 can also toggle operation back to the start bit flow control sub-mode by pulling the voltage on single-wire communication bus 11 low during the stop bit time when target device 14 is attempting to transmit a stop bit. Target device 14 detects this condition and toggles its operation into the start bit flow control sub-mode.

Although the pulling of the voltage of single-wire communication bus 11 low during a stop bit time communicates that operation of the bus is to switch between a start bit flow control sub-mode and a non-flow control sub-mode, the pulling of the voltage on single-wire communication bus 11 low during a stop bit time can, in other embodiments, be used to communicate other information.

Although the present invention has been described in connection with certain specific embodiments for instructional purposes, the present invention is not limited thereto. Although flow control code 82 is a subroutine within communication application 81 in one embodiment, the functionality of flow control code 82 is incorporated into a specialized UART driver that is part of operating system 79 in another embodiment. Although system 10 is described as having debugger functionality in some embodiments, the flow control method of system 10 has general applicability to use with UARTs that is unrelated to any debugging function. Although one embodiment of remote start bit UART 29 turns on a pull-up transistor 66 during the first half of each pulse duration of each logic high bit that follows a logic low bit, in other embodiments pull-up transistor 66 is turned on for the entire pulse durations of logic high bits that follow logic low bits. Although system 10 is described in relation to controlling data flow between a target device and a PC, the remote start bit flow control method described herein is equally applicable to flow control between any two electronic devices connected by a single-wire communication bus. The pulling of the voltage on a single-wire communication bus low to communicate a start bit condition to a target device is usable in buses other than RS232 buses. The mechanism is usable with buses that communicate with more than two devices. For example, system 10 is adaptable for use with an RS485 multi-node bus whose nodes communicate over a twisted pair using differential signaling. Accordingly, various modifications, adaptations, and combinations of various features of the described embodiments can be practiced without departing from the scope of the invention as set forth in the claims.

What is claimed is:

1. A method comprising:
   (a) writing remote data bits into a transmit memory buffer, wherein the remote data bits are transmitted with a remote start bit over a single-wire communication bus; and
   (b) reading received data bits, wherein the received data bits are received from the single-wire communication bus, wherein the received data bits are preceded by the remote start bit, and wherein the receive data bits are supplied by a target device onto the single-wire communication bus before a subsequent remote start bit is detected on the single-wire communication bus by the target device.

2. A method comprising:
   (a) writing remote data bits into a transmit memory buffer, wherein the remote data bits are transmitted with a remote start bit over a single-wire communication bus;
   (b) reading received data bits, wherein the received data bits are received from the single-wire communication bus, and wherein the received data bits are preceded by the remote start bit; and
   (c) writing subsequent remote data bits into the transmit memory buffer after (a) and before (b), wherein the subsequent remote data bits are transmitted with a subsequent remote start bit over the single-wire communication bus, wherein the subsequent remote start bit is received from the single-wire communication bus after the received data bits are received from the single-wire communication bus.

3. A method comprising:
   (a) writing remote data bits into a transmit memory buffer, wherein the remote data bits are transmitted with a remote start bit over a single-wire communication bus; and
   (b) reading received data bits, wherein the received data bits are received from the single-wire communication bus, wherein the received data bits are preceded by the remote start bit, wherein the received data bits are supplied by a target device onto the single-wire communication bus and are received by a host PC from the single-wire communication bus, and wherein the writing in (a) is performed by a driver for the target device that plugs into an operating system running on the host PC.

4. A device comprising:
   a first-in-first-out transmit memory buffer;
   a first-in-first-out receive memory buffer that has a number of free bytes; and
   flow control logic circuitry that fills the first-in-first-out transmit memory buffer with a number of bytes of data that is less than or equal to the number of free bytes in the first-in-first-out receive memory buffer.

5. The device of claim 4, wherein an operating system reads received data bits out of the first-in-first-out receive memory buffer freeing up the number of free bytes in the first-in-first-out receive memory buffer.

6. The device of claim 5, wherein the operating system runs on a central processing unit, and wherein the operating system reads the received data bits out of the first-in-first-out receive memory buffer in response to an interrupt command to the central processing unit.

7. The device of claim 4, wherein a central processing unit reads received data bits out of the first-in-first-out receive memory buffer, wherein the received data bits are received from a single-wire communication bus, and wherein the received data bits are preceded by a remote start bit.

8. The device of claim 4, wherein the flow control logic circuitry fills the first-in-first-out transmit memory buffer with bytes of data comprising a hex character [FF].

9. The device of claim 4, further comprising:
   a single-wire communication bus coupled both to the first-in-first-out transmit memory buffer and to the first-in-first-out receive memory buffer.

10. The device of claim 9, wherein the single-wire communication bus is coupled to the first-in-first-out transmit memory buffer through a transmit shift register.

11. The device of claim 9, wherein the single-wire communication bus is coupled to an open-drain interface.

12. A system comprising:
    a single-wire communication bus, wherein multiple receive data bits flow over the single-wire communication bus to a receiving device; and
    means for controlling how the multiple receive data bits flow over the single-wire communication bus by supplying a single remote start bit onto the single-wire communication bus, wherein the means supplies the remote start bit onto the single-wire communication bus by supplying a hex character [FF] onto the single-wire communication bus.

13. The system of claim 12, wherein an RS232 character comprises the remote start bit and the hex character [FF].

14. A method comprising:
    (a) writing remote data bits into a transmit memory buffer, wherein the remote data bits are transmitted with a remote start bit over a single-wire communication bus;
    (b) reading received data bits, wherein the received data bits are received from the single-wire communication bus, wherein the remote start bit occupies a pulse duration that immediately precedes the received data bits, and wherein a first RS232 character comprises the remote start bit and the received data bits; and
    (c) receiving a second RS232 character, wherein the first RS232 character and the second RS232 character are received back-to-back without any inter-character pause.

15. The device of claim 4, wherein sixty-four Kbytes of data are received into the first-in-first-out receive memory buffer after the device receives a single read request command.

16. The method of claim 1, wherein the received data bits convey more than a single bit of data.

17. The method of claim 1, wherein the remote start bit occupies a pulse duration that immediately precedes the received data bits.

18. The method of claim 1, wherein an RS232 character comprises the remote start bit and the received data bits.

19. The method of claim 1, wherein the remote start bit is a digital logic low, and each of the remote data bits is a digital logic high.

20. The method of claim 1, wherein eight remote data bits are written in (a), and the remote data bits represent the hex character [FF].

21. The method of claim 1, wherein the transmit memory buffer is a first-in-first-out memory buffer of a universal asynchronous receiver/transmitter.

22. The method of claim 1, further comprising:
    (c) writing additional remote data bits into the transmit memory buffer after reading the received data bits in (b).

23. The method of claim 1, wherein the received data bits are supplied by a target device onto the single-wire communication bus and are received by a host PC from the single-wire communication bus, and wherein the writing in (a) is performed by an operating system running on the host PC.

24. The system of claim 12, wherein data is both transmitted and received over the single-wire communication bus.

25. The system of claim 12, wherein the means comprises an operating system.

26. The system of claim 12, wherein the means comprises a universal asynchronous receiver/transmitter.

27. The system of claim 12, wherein the single remote start bit occupies a pulse duration that immediately precedes the multiple receive data bits.

* * * * *